US012650901B2

(12) United States Patent
Aya et al.

(10) Patent No.: US 12,650,901 B2
(45) Date of Patent: Jun. 9, 2026

(54) DATABASE METADATA CORRUPTION MITIGATION

(71) Applicant: Snowflake Inc., Bozeman, MT (US)

(72) Inventors: Selcuk Aya, Izmir (TR); Leonid Baraznenok, Bothell, WA (US); Jaeha Lee, Redmond, WA (US); Adrian Peter Neumann, Berlin (DE); Ryan Michael Thomas Shelly, San Francisco, CA (US); Zerui Wei, San Mateo, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/948,923

(22) Filed: Nov. 15, 2024

(65) Prior Publication Data

US 2025/0068522 A1    Feb. 27, 2025

Related U.S. Application Data

(63) Continuation of application No. 18/104,249, filed on Jan. 31, 2023, now Pat. No. 12,174,702, which is a continuation of application No. 17/804,700, filed on May 31, 2022, now Pat. No. 11,593,212.

(51) Int. Cl.
| | |
|---|---|
| *G06F 16/00* | (2019.01) |
| *G06F 11/07* | (2006.01) |
| *G06F 11/14* | (2006.01) |
| *G06F 16/215* | (2019.01) |

(52) U.S. Cl.
CPC ........ *G06F 11/1435* (2013.01); *G06F 11/079* (2013.01); *G06F 16/215* (2019.01)

(58) Field of Classification Search
None
See application file for complete search history.

(56) References Cited

U.S. PATENT DOCUMENTS

| | | | |
|---|---|---|---|
| 7,177,993 B1 * | 2/2007 | Kiselev | G06F 11/1435 |
| | | | 714/6.23 |
| 9,152,502 B2 * | 10/2015 | Kalach | G06F 11/1435 |
| 2005/0257097 A1 * | 11/2005 | Jarvis | G06F 11/1435 |
| | | | 714/42 |

(Continued)

FOREIGN PATENT DOCUMENTS

WO    WO-2022087497 A1 *  4/2022  ........... G06F 40/279

OTHER PUBLICATIONS

JP-2023564679-A, "Device, System, and Method For Protecting Machine Learning, Artificial Intelligence, and Deep Learning Units", Apr. 14, 2022, 28 Pages. (Year: 2022).*

(Continued)

*Primary Examiner* — Bai D Vu
(74) *Attorney, Agent, or Firm* — Schwegman Lundberg & Woessner, P.A.

(57) ABSTRACT

A data protection system is provided. The data protection system performs identification of errors from queries on a database. The data protection system can further identify corrupted data from additional errors, that are difficult to detect, and occur between layers of data in the database system. The data protection system can perform corrections of the error data by rebuilding database data or removing the corrupted data.

30 Claims, 8 Drawing Sheets

(56) References Cited

U.S. PATENT DOCUMENTS

| | | | | |
|---|---|---|---|---|
| 2008/0126913 A1* | 5/2008 | Benhanokh | G06F 11/1435 | 714/763 |
| 2012/0159243 A1* | 6/2012 | Havewala | G06F 11/0727 | 714/15 |
| 2012/0159255 A1* | 6/2012 | Havewala | G06F 11/1435 | 714/37 |
| 2021/0374569 A1* | 12/2021 | Jezewski | G06N 20/00 | |

OTHER PUBLICATIONS

"U.S. Appl. No. 18/104,249, Advisory Action mailed Oct. 25, 2023", 3 pgs.

"U.S. Appl. No. 18/104,249, Examiner Interview Summary mailed Jul. 1, 2024", 2 pgs.

"U.S. Appl. No. 18/104,249, Final Office Action mailed Apr. 1, 2024", 10 pgs.

"U.S. Appl. No. 18/104,249, Final Office Action mailed Aug. 16, 2023", 16 pgs.

"U.S. Appl. No. 18/104,249, Non Final Office Action mailed Apr. 19, 2023", 24 pgs.

"U.S. Appl. No. 18/104,249, Non Final Office Action mailed Dec. 14, 2023", 8 pgs.

"U.S. Appl. No. 18/104,249, Notice of Allowance mailed Aug. 16, 2024", 10 pgs.

"U.S. Appl. No. 18/104,249, Preliminary Amendment filed Feb. 2, 2023", 8 pgs.

"U.S. Appl. No. 18/104,249, Response filed Mar. 14, 2024 to Non Final Office Action mailed Dec. 14, 2023", 13 pgs.

"U.S. Appl. No. 18/104,249, Response filed Jun. 28, 2024 to Final Office Action mailed Apr. 1, 2024", 14 pgs.

"U.S. Appl. No. 18/104,249, Response filed Jul. 19, 2023 to Non Final Office Action mailed Apr. 19, 2023", 15 pgs.

"U.S. Appl. No. 18/104,249, Response filed Oct. 16, 2023 to Final Office Action mailed Aug. 16, 2023", 9 pgs.

* cited by examiner

500

PROCESS DATABASE STATEMENTS
505

PERFORM ON-LINE CHECKS
510

FIX ERRORS FROM ONLINE CHECKS
515

PERFORM OFF-LINE CHECKS
520

FIX ERRORS FROM OFF-LINE CHECKS
525

DATABASE METADATA CORRUPTION MITIGATION

PRIORITY APPLICATIONS

This application is a continuation of U.S. patent application Ser. No. 18/104,249, filed Jan. 31, 2023, now issued as U.S. Pat. No. 12,174,702, which is a continuation of U.S. patent application Ser. No. 17/804,700, filed May 31, 2022, and now issued as U.S. Pat. No. 11,593,212, the contents of which is incorporated herein by reference in their entireties.

TECHNICAL FIELD

The present disclosure generally relates to efficiently managing database errors in a distributed database.

BACKGROUND

Databases are used for data storage and access in computing applications. A goal of database storage is to provide enormous sums of information in an organized manner so that it can be accessed, managed, and updated. In a database, data may be organized into rows, columns, and tables. As data is processed in databases, errors can occur which cause corruption of the database data.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
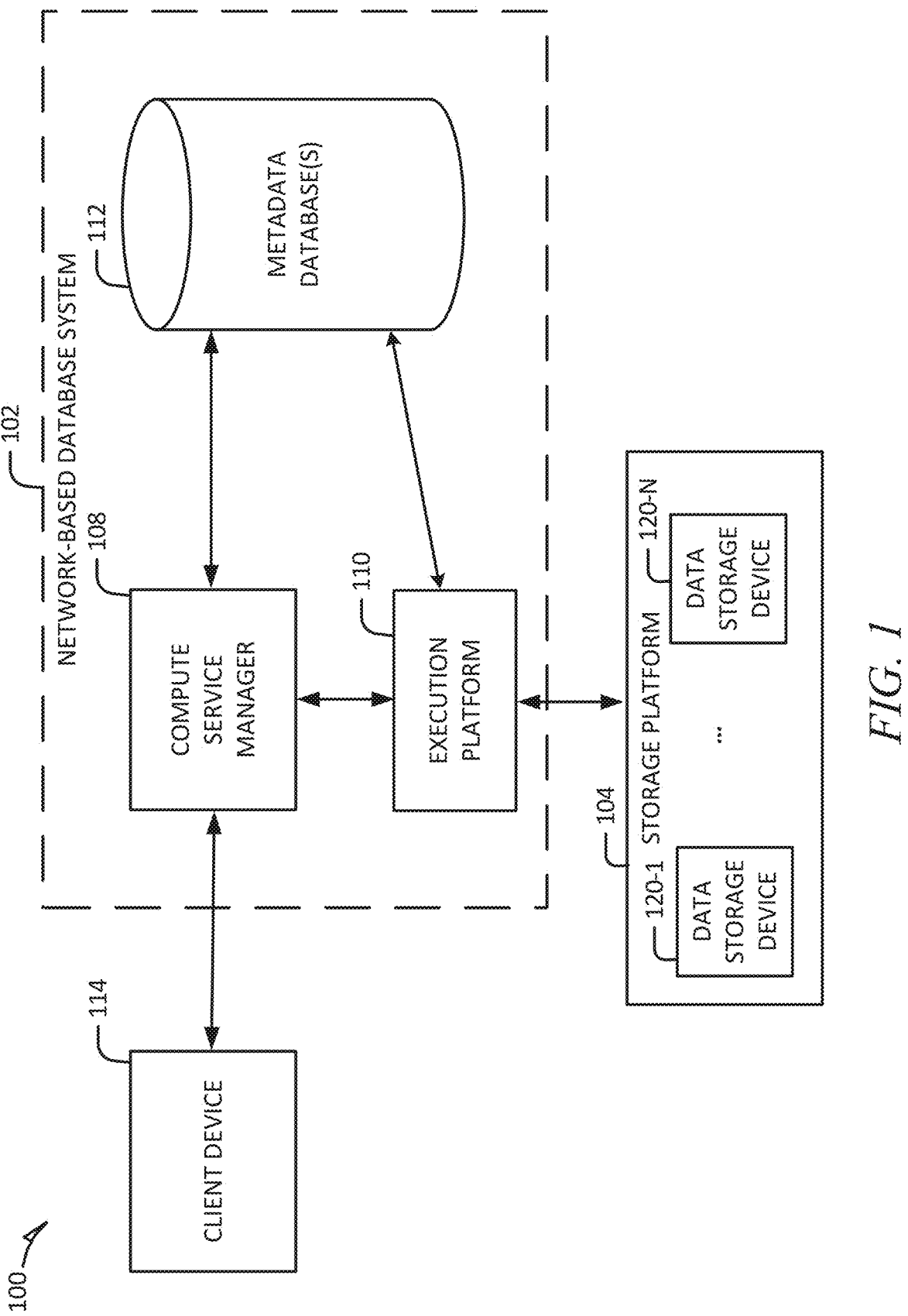
FIG. 1 illustrates an example computing environment in which a network-based database system can implement a data protection system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A database can include one or more individual error checking tools that operate within individual database components to help detect issues within that giving component and raise notifications or flags to administrators. Generally, these approaches are ad hoc in nature and do not systematically check and cover different categories of data corruption possibilities. Further, these types of approaches can only be applied for new data to be written via queries, including DMLs and DDL operations. Hence, more expensive error checking is not feasible, and these checks over new data do not cover latent issues with already stored data. Further, these conventional approaches do not have a mechanism for detecting the blast radius of the data corruption issue (e.g., there may be a number of unknown corruption issues where it is not known how many existing users and/or user tables are impacted, and thus within a blast radius of a known and found error).

To address the foregoing, a data protection system is configured to perform online data checks (e.g., during the query or DML/DDL) as well as off-line data checks (e.g., off-line data checks run as a background service) to comprehensively mitigate and avoid data corruption issues. In some example embodiments, the data protection system systematically checks all interfaces between layers of metadata of the database and the underlying data processing to detect both known and unknown potential data corruptions. Further, the data protection system is configured to provide more diversity in the types of checks performed as the checks are completed in the background and more compute-intensive operations can be performed. Further, in accordance with some example embodiments, the data protection system is configured to check existing data in the system, thereby completing checking of latent issues in stored data, which can further be implemented by the data protection system to determine the blast radius of newly detected issues (e.g., data corruption in newly stored data that has had an effect on existing stored data).

Data issues that arise from one or more of the components of the database system include: compiler issues (e.g., nullability, physical type mismatch), execution engine issues (e.g., lack of integrity checks performed during data ingestion, corruption during the semi-structured data processing, collation issues), file registration errors (e.g., UTF-8 String character encoding mismatches, Fixed-Length Numeric Data Type precision mismatches). Further issues can arise between the database layers, e.g., from mismatches between information stored in the different layers. For example, there may be a column metadata and expression property (EP) metadata mismatch, or an EP metadata and micro partition data mismatch.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses.") The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, metadata database(s) 112 may include a summary of data stored in remote data storage systems as well as data available from a local cache. Additionally, metadata database(s) 112 may include information regarding how data is partitioned and organized in remote data storage systems (e.g., the cloud storage platform 104) and local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query, and scanning only the pertinent micro-partitions to respond to the query. Metadata may be automatically gathered on all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata databases 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112, execution platforms 110, and cloud storage platforms 104 may be implemented as a distributed system (e.g., distributed across multiple systems/platforms at multiple geographic locations). Additionally, each of the compute service managers 108, metadata databases 112, execution platforms 110, and cloud storage platforms 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2A:
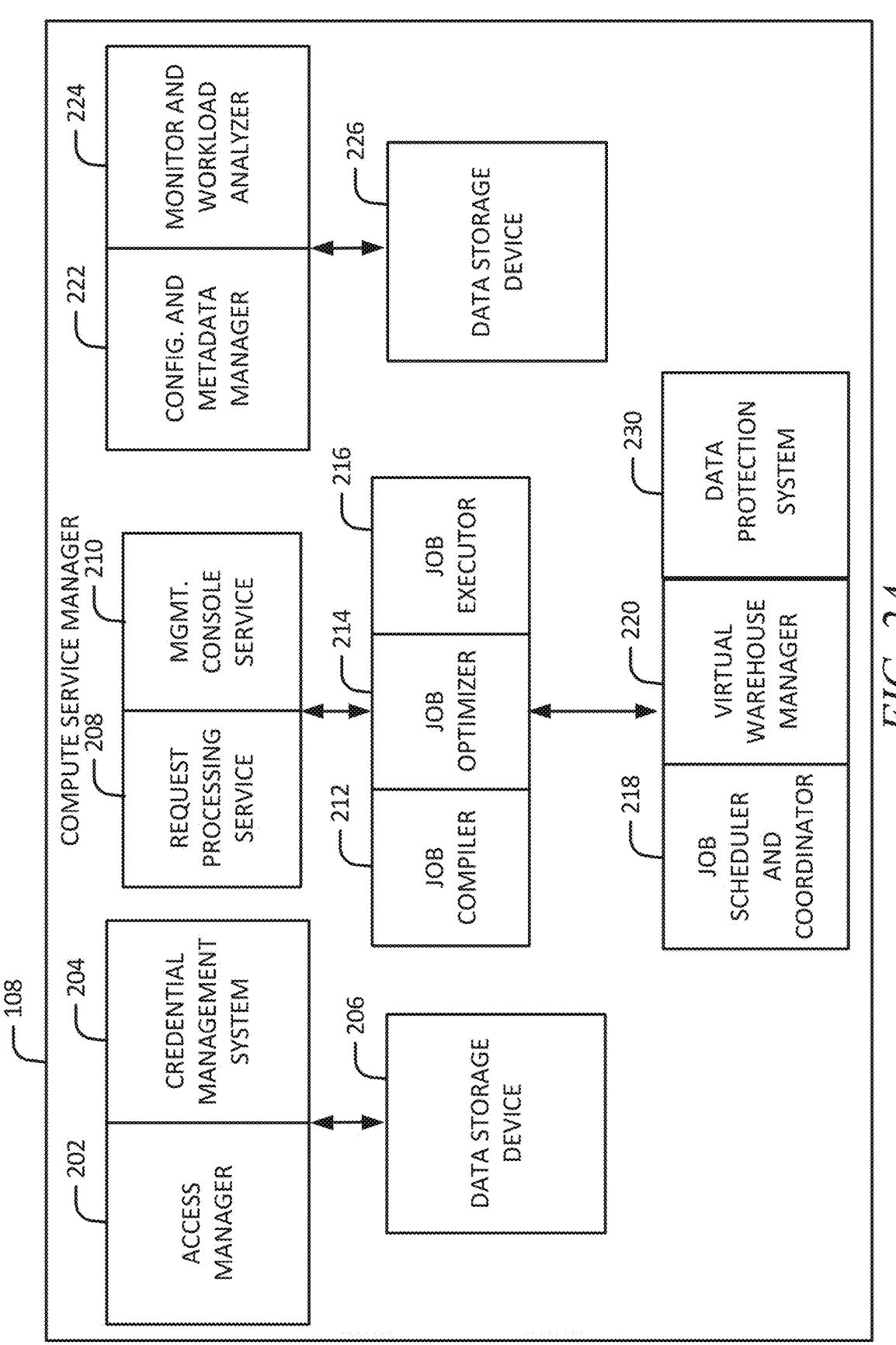
FIGS. 2A-2C are diagrams illustrating components of a compute service manager and data protection system and an example query plan, according to some example embodiments.

FIG. 2A is a block diagram illustrating components of the compute service manager 108, in accordance with some embodiments of the present disclosure. As shown in FIG. 2A, the compute service manager 108 includes an access manager 202 and a credential management system 204 coupled to data storage device 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., an access metadata database in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and then processed in that prioritized order. In an embodiment, the job scheduler and coordinator 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The data protection system 230 is configured to perform online error checking and offline error checking, as discussed in further detail below.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), and should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

Figure 2B:
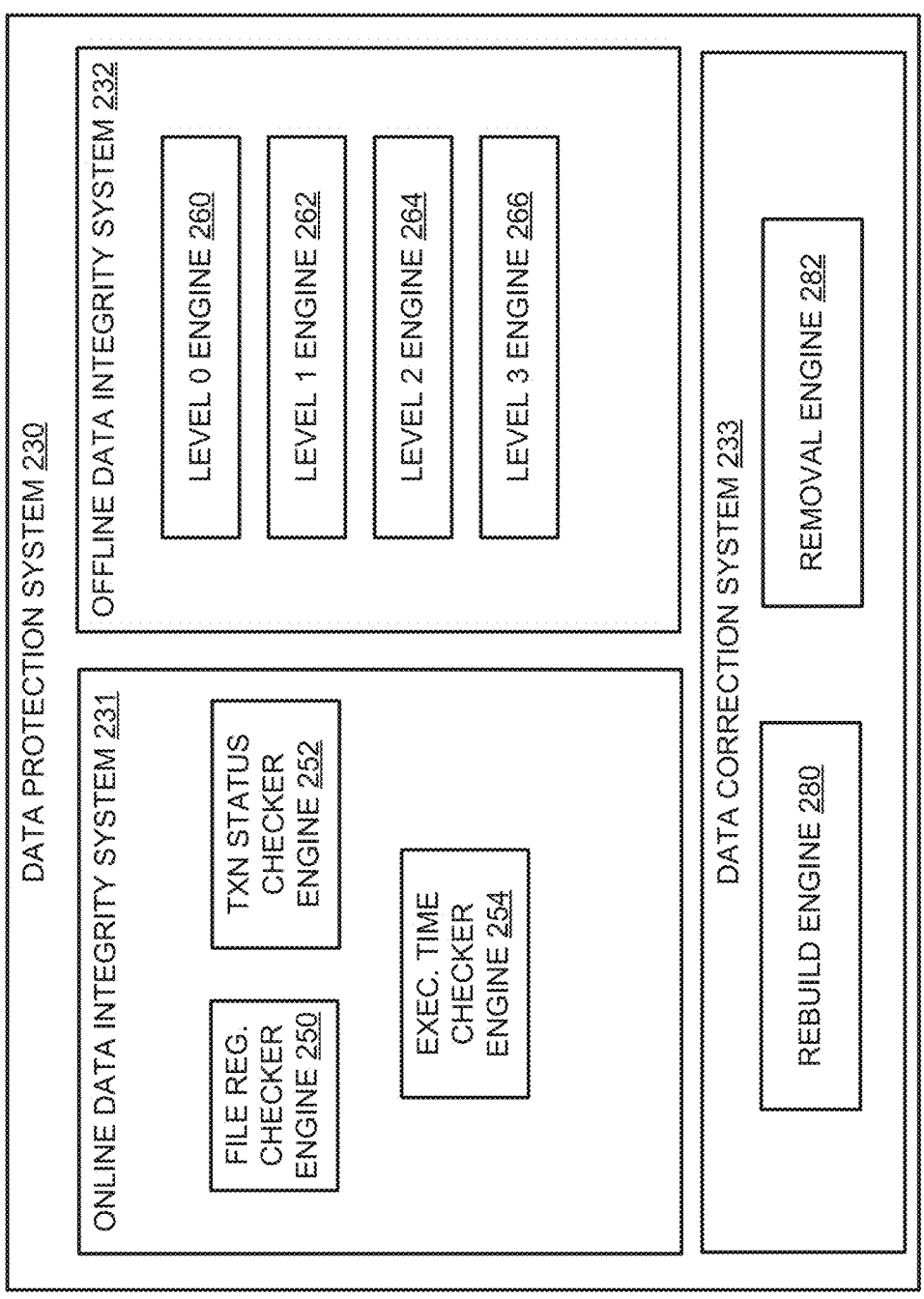

FIG. 2B shows example functional components of the data protection system 230, according to some example embodiments. The data protection is illustrated in FIG. 2B; the data protection system 230 comprises an online data integrity system 231, an off-line data integrity system 232, and a data correction system 233. The online data integrity system 231 is configured to perform light weight checks that can be completed with minimum overhead, where the checks are done as part of database read and write operations (e.g., DML operations). In this way, the online data integrity system 231 prevents corruption from happening in the first place. In some example embodiments, the online data integrity system 231 comprises a file registration checker engine 250, the transaction status checker engine 252, and an execution time check engine 254. The file registration checker engine 250 is configured to (1) identify column properties from compilation (e.g., from column metadata or EP metadata), (2) check expression properties from new file registration requests to detect violations, (3) target column properties (e.g., nullability, min/max ranges, datatype length, collations), and (4) perform strict issue checking for re-clustering and/or defragmentation issues. The transaction status checker engine 252 is configured to perform DML row count checks (e.g., to determine whether we are seeing expected row count changes after each new table version, depending on a DML type). The execution time check engine 254 is configured to perform recluster accumulated hash checks and perform debug mode checks. Although only three check systems are discussed as an example, it is appreciated that additional online check engines can be added to the online data integrity system 231 to check for errors arising in a given database environment.

The off-line data integrity system 232 is configured to be more comprehensive and computationally intensive than the online checks, such as analyzing stored data in order to determine mismatches and the blast radius of a given data corruption or issue. In some example embodiments, the off-line data integrity system 232 comprises an extensible framework with different levels of checks that have increasing levels of computational processing and may require more time. In some example embodiments, the extensible framework of the off-line data integrity system 232 comprises: a level 0 engine 260 to perform level 0 checks, a level 1 engine 262 to perform level 1 checks, a level 2 engine 264 to perform level 2 checks, and a level 3 engine 266 to perform level 3 checks.

The level 0 checks compare column and/or data type metadata against the global cumulative expression properties data to determine mismatches (e.g., mismatches in nullability, mismatches in data length). The level 1 checks determine the consistency between the global cumulative expression properties and second level EPs (e.g., mismatches in nullability, mismatches in data types, mismatches in min/max values). The level 2 checks determine the consistency between EPs and micro-partition headers (e.g., null count, datatype, min/max values, and collation) and further checks for issues in sub-columns. The level 3 checks the consistency between the micro partition headers and the underlying data (e.g., user data, stored table data). The checks are also extensible to other database components and new features added to the database. For example, an extension to level 0 can be added to further support dedicated consistency checks for Materialized Views, Change Tracking or tables containing Geo columns. These features contain specific column metadata that can be checked separately using the extensible framework provided by the consistency checking infrastructure.

In some example embodiments, the off-line data integrity system 232 is implemented as a large-scale data and metadata consistency check background service (e.g., implemented as a compute service that is triggered by compaction or clustering events on the network-based database system 102). Some example embodiments, the off-line data integrity system 232 implements the level 2 and level 3 checks as SQL queries. For example, a dedicated table function can be compiled into a query plan with integrated data consistency checks, in which expression properties metadata is scanned and then input into a table scan operator, such that the checks are performed via table scans. The background service could be configured to run with multiple modes, including systematically scanning through all existing objects in the system to detect latent issues, or doing targeted blast radius analysis for a narrower subset of Database Objects. Depending on the computational cost of the checks, sampling rates could also be configured to catch issues with lower overhead.

The data correction system 233 comprises the rebuild engine 280 and the removal engine 282, according to some example embodiments. The rebuild engine 280 activates when the underlying data can still be read and is assumed not to be corrupted, however there exists issues in the metadata that correspond to the underlying data. In some example embodiments, the rebuild engine 280 incrementally rebuilds a specified subset of the micro partition files and all metadata that is related to the micro partition files (e.g., incrementally rebuilding damaged tables from logs, or backed up data versions). In some example embodiments, the rebuild engine 280 maintains a rebuilt state on the table and runs continuously (e.g., incrementally, as background service) until all the files are rebuilt to mitigate between data layer corruption based issues for the network-based database system 102.

The removal engine 282 performs file blacklisting and patching for data that is corrupted and unreadable, and cannot be recovered. In some example embodiments, the removal engine 282 blacklists the file temporarily to allow queries on the table to succeed during the further investigation and analysis of the issue. In some example embodiments, the blacklisted files are excluded from the results of database APIs that access file and EP metadata. In some example embodiments, the removal engine 282 implements a DML patch to remove the file permanently from the table. Although FIG. 2B shows several examples of engines implemented in the data protection system 230, it is appreciated that further engines can be added to extend the types of error checks (e.g., a new engine in the online data integrity system 231 or off-line data integrity system 232 to check and protect data of a newly implemented database feature or tool). In some example embodiments, the data protection system 230 is initiated via a query from a user (e.g., implemented as a query that executes natively within by the distributed database system 102, thereby leveraging the native database capabilities, such as scalability and parallel execution capabilities of the distributed database system 102.

In this way, the data protection system 230 enables the distributed database system 102 to implement an integrated self-check system, as opposed to having bespoke checks that are decoupled and are implemented by external tools outside of the database architecture.

Figure 2C:
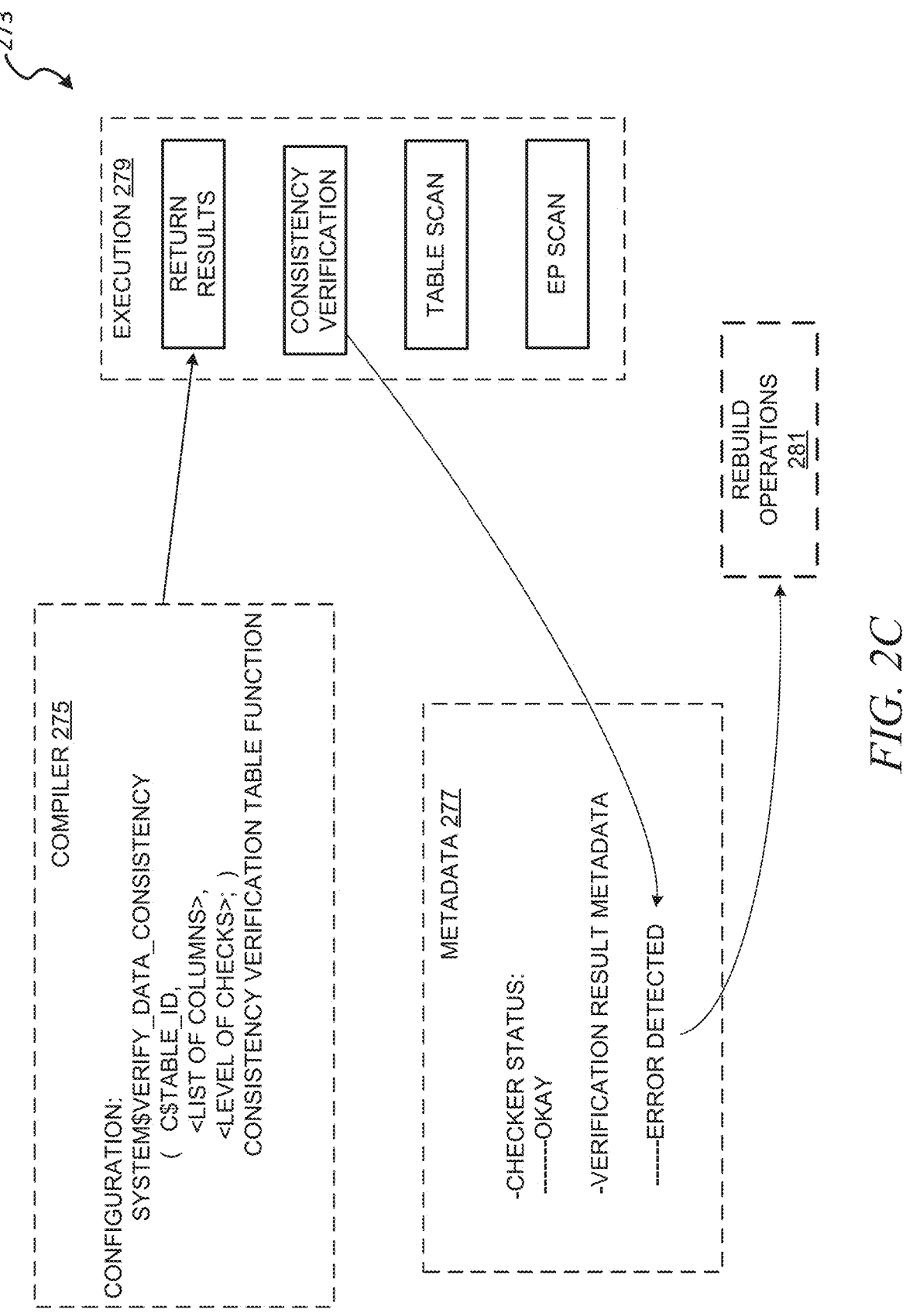

FIG. 2C shows an example query plan diagram 273 of the data protection system 230 implementing data consistency verification and correction operations, according to some example embodiments. The compiler operations 275 of the query plan diagram 273 comprise parameters to implement a query (e.g., a database query) with integrated checks. For example, the (C$TABLE_ID, <LIST OF COLUMNS>, <LEVEL OF CHECKS>;) is a list of arguments to the function call. An example general form the list of arguments and the function call includes:

system$verifiy_data_consistency ($table_id, < >, < >, . . . ), where additional argument can be specified in between a "< >" set of brackets.

The execution operations 279 of the query plan diagram 273 comprise operations to return results, initiate data consistency verifications (offline checks), and table and expression property scan operations. The metadata operations 277 implements metadata checks (e.g., checker status operations, verification result metadata operations, which run in parallel), and if an error is detected one or more rebuild operations 281 are implemented by the data protection system 230 to fix the corrupted data.

Figure 3:
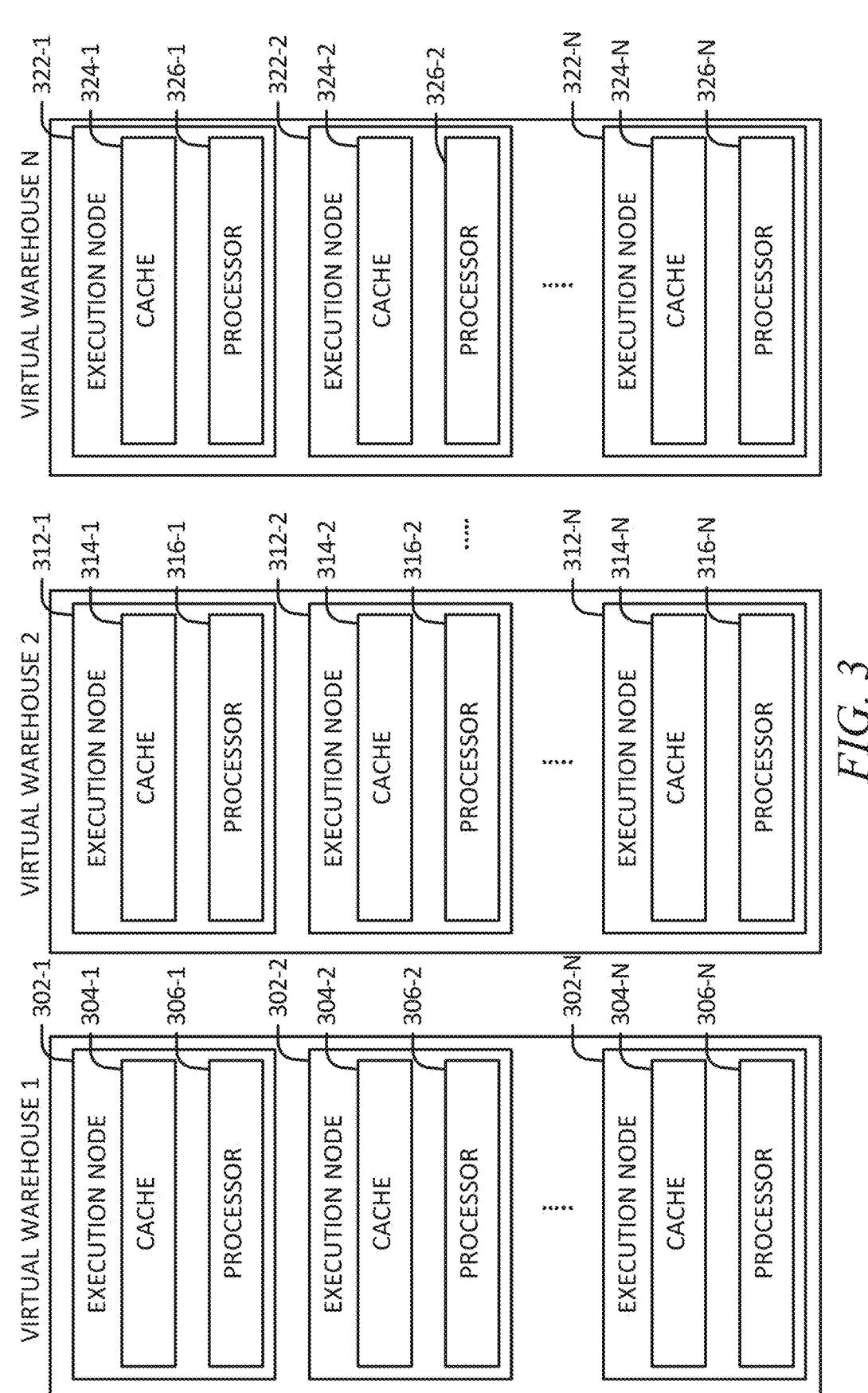
FIG. 3 is a block diagram illustrating components of an execution platform, according to some example embodiments.

FIG. 3 is a block diagram illustrating components of the execution platform 110 of FIG. 1, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
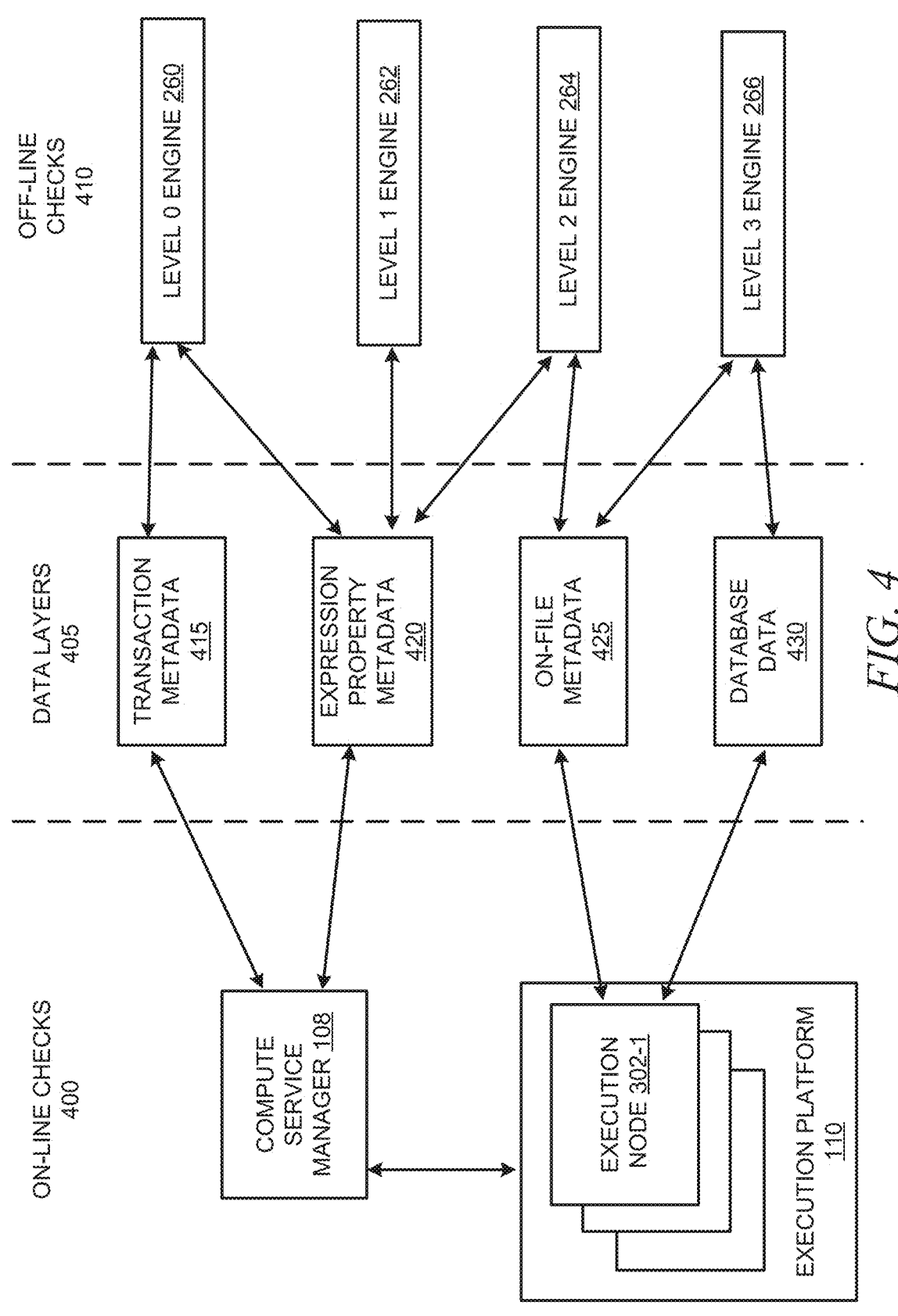
FIG. 4 shows a functional database architecture for implementing the data protection system, according to some example embodiments.

FIG. 4 shows a functional data architecture for online and offline checks, according to some example embodiments. As illustrated, online checks 400 (e.g., checks performed during processing of DML statements) are performed by checkers running in the compute service manager 108 of FIG. 1, which orchestrates queries for execution in a plurality of nodes (e.g., FIG. 3) such as execution node 302-1, which also has one or more online checkers running and performing online checks for errors. The compute service manager 108, in the plurality of nodes comprising execution node 302-1, interact with data layers 405 (e.g., metadata data store layers and a database data layer) in a hierarchy to find the queried data for processing in database data 430 (e.g., a highest level of the data layers 405, such as database data distributed across cloud storage platform 104 in data storage device 120-1 to data storage device 120-N (FIG. 1)), and track the database data 430 using a plurality of metadata layers. In the example illustrated, the metadata layers comprise a transaction metadata 415 layer (e.g., key-value storage in data storage device 226 of FIG. 2A comprising transaction metadata, dictionary metadata), and expression property metadata 420 layer (e.g., comprising file metadata dataset, an expression properties dataset) which interacts with the compute service manager 108. In some example embodiments, EP metadata can comprise a cumulative expression property including global information about a plurality of expression properties. The table metadata includes the plurality of expression properties that are associated with the cumulative expression property, and each of the plurality of expression properties includes information about one or more columns stored within a micro-partition of the one or more micro-partitions of the database. In some example embodiments, an expression property is some information about the one or more columns stored within one or more micro-partitions. In an embodiment, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and so forth. A cumulative expression property includes global information about data stored in a plurality of expression properties. Similar to the expression property, the cumulative expression property includes any suitable information about database data and/or the database itself. The cumulative expression property may store a summary of the information stored within the plurality of expression properties to which it is associated. In an embodiment, the cumulative expression property includes one or more of: a summary of the data stored across each of one or more micro-partitions of a table, a type of data stored in one or more columns across each of one or more micro-partitions of a table, a global minimum and maximum for data stored across each of one or more micro-partitions of a table, and so forth.

In some example embodiments, on file metadata 425 comprises metadata that is local to each execution node, such that the execution node can process data according to a given query (e.g., micro partition header data, comp blocks metadata) to perform operations (e.g., retrieve queried data, perform table scans, projections, etc.) to implement read or write changes to the database data 430. Further details on the metadata are discussed in U.S. Pat. No. 10,977,278, titled "Multi-level metadata in database systems", filed on Feb. 22, 2019, which is hereby incorporated by reference in its entirety.

In some example embodiments, to identify latent errors that arise between layers of metadata (e.g., caused by an error found from online checks), the off-line data integrity system 232 implements off-line checks 410. As illustrated, the level 0 engine 260 of FIG. 2B can perform a level 0 check for correspondence of data between the transaction metadata 415 and in the expression property metadata 420 (e.g., check and confirm that each layer has matching values, pointers, names of database files, users, and database objects). Further, the level 1 engine 262 of FIG. 2B can perform checks for correspondence to ensure that the lower level data (e.g., first level EP data) within the expression property metadata 420 corresponds or matches higher level data (e.g., second level EP data) in the expression property metadata 420. The level 2 engine 264 of FIG. 2B can perform checks for correspondence of the data between the expression property metadata 420 and on file metadata 425. Further, the level 3 engine 266 of FIG. 2B can check for correspondence between the on file metadata 425 to in the database data 430.

The following is an example implementation of queries being processed on the architecture of FIG. 4, in some example embodiments. In the compute service manager 108, a compile service receives one or more queries, and transmits the queries to the execution platform 110 for execution. The execution platform 110 receives the queries and implements the execution time check engine 254 of FIG. 2 to perform reclustered cumulated hash checks and execution node debugging checks. In some example embodiments, the plurality of nodes in the execution platform 110 then creates and uploads files according to the query. In some example embodiments, during the creation and upload process, one or more nodes in the execution platform 110 update micro partition header data in the on file metadata 425 and perform the requested operations (e.g., DML statements) on the database data 430 (e.g., writes, reads). Further, during the creation and upload process in the execution platform, one or more of the nodes contacts the compute service manager 108 to perform file registration, in which the compute service manager 108 updates file metadata in the expression property metadata 420 layer to include the latest changes received from the execution platform. In some example embodiments, upon file registration, file registration checker engine 250 implements online file registration checks to identify file registration errors.

With reference to the execution platform 110, in some example embodiments, during the create and upload files process, the transactions used in the queries are submitted to a commit transaction process in the compute service manager 108. The commit transaction process in the compute service manager 108 updates the transaction metadata 415 (e.g., updates key-value metadata). In some example embodiments, during the commit transaction process, the transaction status checker engine 252 of FIG. 2B performs live transaction status checks to identify errors.

Further as discussed, in some example embodiments the off-line data integrity system 232 of FIG. 2B is implemented as a background service that periodically checks for latent, hard to detect errors that arise between the metadata layers. In some example embodiments, the off-line data integrity system 232 first checks any metadata that corresponds to errors found using the online checks system. In some example embodiments, the off-line data integrity system 232 does not start with data related to the online error checks, and instead incrementally proceeds to all of the data layers 405 to check for any errors in mismatches that arise anywhere. In some example embodiments, the off-line checks 410 are performed sequentially, in order from level 0 checks, to level 1 checks, and so on in an increasing sequence through the hierarchy. As an example, the level 0 engine 260 is first activated to perform correspondence of data and identify mismatches between a dictionary data set in the transaction metadata 415 and a first level of expression property data in the expression property metadata 420. Next, the level 1 engine 262 performs level I checks to check for correspondence between the first level expression property data and a second level expression property data. Next, the level 2 engine 264 checks for correspondence between the expression properties of the expression property data set, in the expression property metadata 420 and micro partition header data in the on file metadata 425, to ensure that they match and have consistent values for the data that is changed or otherwise has been updated (e.g., write, insert, delete). Next, the level 3 engine 266 performs level 3 checks including checking for correspondence and matching between the micro partition header data and compressed blocks header data, and checking for further correspondence between the compressed blocks header data and the underlying payload data in the database data 430. In some example embodiments, each level can be performed independently. For example, the checks at the levels can be decoupled from each other and can be checked completely separately (e.g., to initiate and perform checking only at a single level to identify errors at that level), in accordance with some example embodiments.

In some example embodiments, the data protection system 230 configures the online and offline detection to function in concert to perform automatic detection and correction of errors. The online checks detect and fix errors during execution, while the offline checks can be performed "offline" in the background, to enable the data protection system to perform a much more expansive set of checks (e.g., latent error detection, rebuilds), with no impact on database end-user's online query performance. In some example embodiments, the data protection system configures different levels of checks to be initiated on different frequencies with different data sampling rates. In some example embodiments, the data protection system is configured to initiate dedicated check engines that can be performed on demand to narrow down and identify the blast radius of the corrupted data (e.g., the extent and location(s) of corrupted data).

Figure 5:
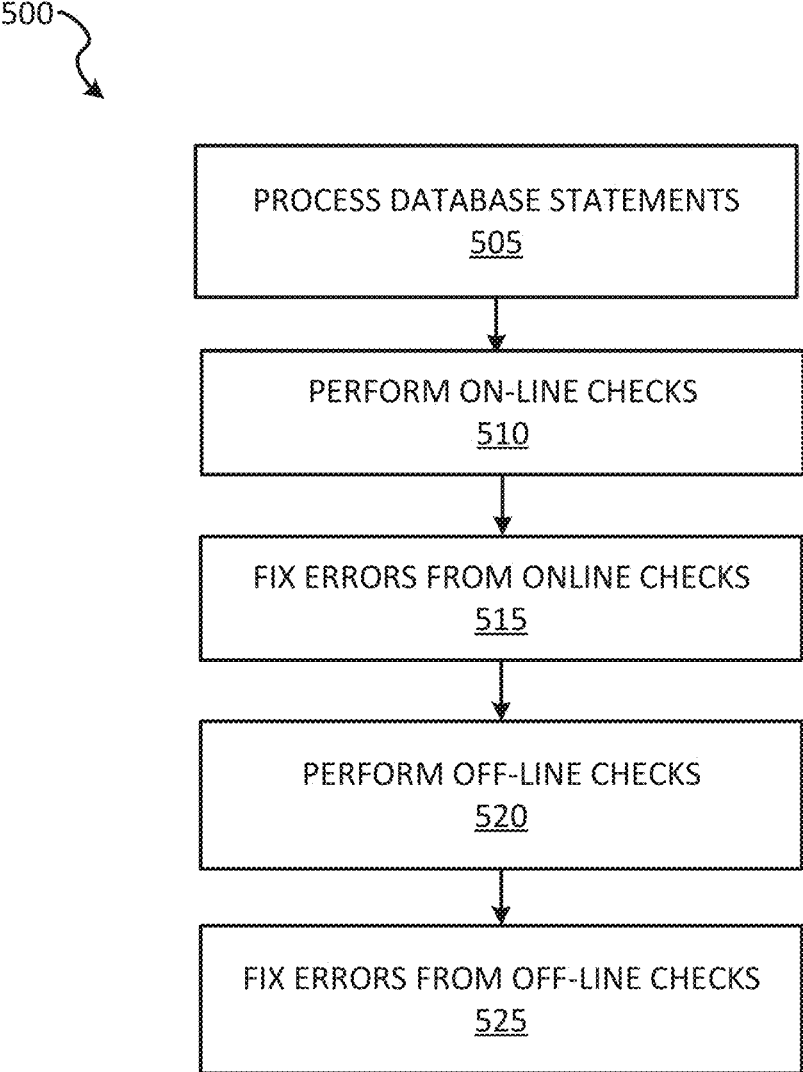
FIG. 5 shows a flow diagram of a method for implementing data corruption mitigation and avoidance processes using the data protection system, according to some example embodiments.

FIG. 5 shows a flow diagram of a method 500 for implementing data corruption mitigation and avoidance processes using the data protection system 230 of FIGS. 2A and 2B, according to some example embodiments. At operation 505, the network-based database system 102 processes database statements such as queries that read or write data to the database. At operation 510, the online data integrity system 231 performs online checks of data during processing of the queries (e.g., during processing of DML statements received from one or more client devices). At operation 515, the data correction system 233 of FIG. 2B fixes the errors that have been detected during the online checks. For example, the data correction system 233 implements the removal engine 282 of FIG. 2B to delete or otherwise remove corrupt data, or optionally rebuild the data (e.g., rebuild tables in one or more of the metadata layers) using the rebuild engine 280. At operation 520, the off-line data integrity system 232 performs off-line checks of data to the identify latent and difficult to detect corrupted data (e.g., mismatches of data between metadata layers, where the mismatches are caused from online errors the detected online errors). At operation 525, the data correction system 233 fixes the errors that are detected from the off-line checks, for example by removing and rebuilding the data.

Described implementations of the subject matter can include one or more features, alone or in combination as illustrated below by way of example.

Example 1. A method comprising: receiving one or more queries on a database system, the database system comprising database data that is distributed across a plurality of nodes, the database data tracked using a metadata datastore comprising a plurality of metadata levels; identifying, by at least one hardware processor, one or more errors in the database system caused from the one or more queries being processed on the database data; identifying corrupted data comprising additional errors, the identifying corrupted data comprising checking for mismatched metadata values between different levels of the plurality of metadata levels; and correcting the corrupted data in one or more of the plurality of metadata levels based on the mismatched metadata values between the different levels of the plurality of metadata levels.

Example 2. The method of example 1, wherein correcting the corrupted data comprises replacing mismatched data with corrected data in one or more of the plurality of metadata levels.

Example 3. The method of any of examples 1 or 2, wherein correcting the corrupted data comprises deleting the corrupted data.

Example 4. The method of any of examples 1-3, wherein the additional errors comprises one or more data payload errors comprising a mismatch between database data and one or more of the plurality of metadata levels.

Example 5. The method of any of examples 1-4, wherein identifying the one or more errors comprises performing online error checking, the performing online error checking comprising checking for database errors while the queries are processed on the database data.

Example 6. The method of any of examples 1-5, wherein the one or more errors occur in the database system in processing the queries on the database data.

Example 7. The method of any of examples 1-6, wherein the one or more errors occur in one or more of the plurality of nodes in processing the queries on the database data.

Example 8. The method of any of examples 1-7, wherein the metadata datastore is distributed across the database system and the plurality of nodes.

Example 9. The method of any of examples 1-9, wherein correcting the corrupted data comprises incrementally building one or more tables of the metadata datastore using a background service of the database system.

Example 10. The method of any of examples 1-9, wherein the plurality of metadata levels are in a hierarchy, and identifying the corrupted data comprises checking for mismatches in an increasing sequence from a lower level in the hierarchy to a higher level in the hierarchy, a highest level in the hierarchy being a database data level that comprises the database data that is processed according to the queries.

Example 11. A system comprising: one or more processors of a machine; and at least one memory storing instructions that, when executed by the one or more processors, cause the machine to perform operations implementing any of examples 1-10.

Example 12. A machine-readable storage device embodying instructions that, when executed by a machine, cause the machine to perform operations implementing any of examples 10.

Figure 6:
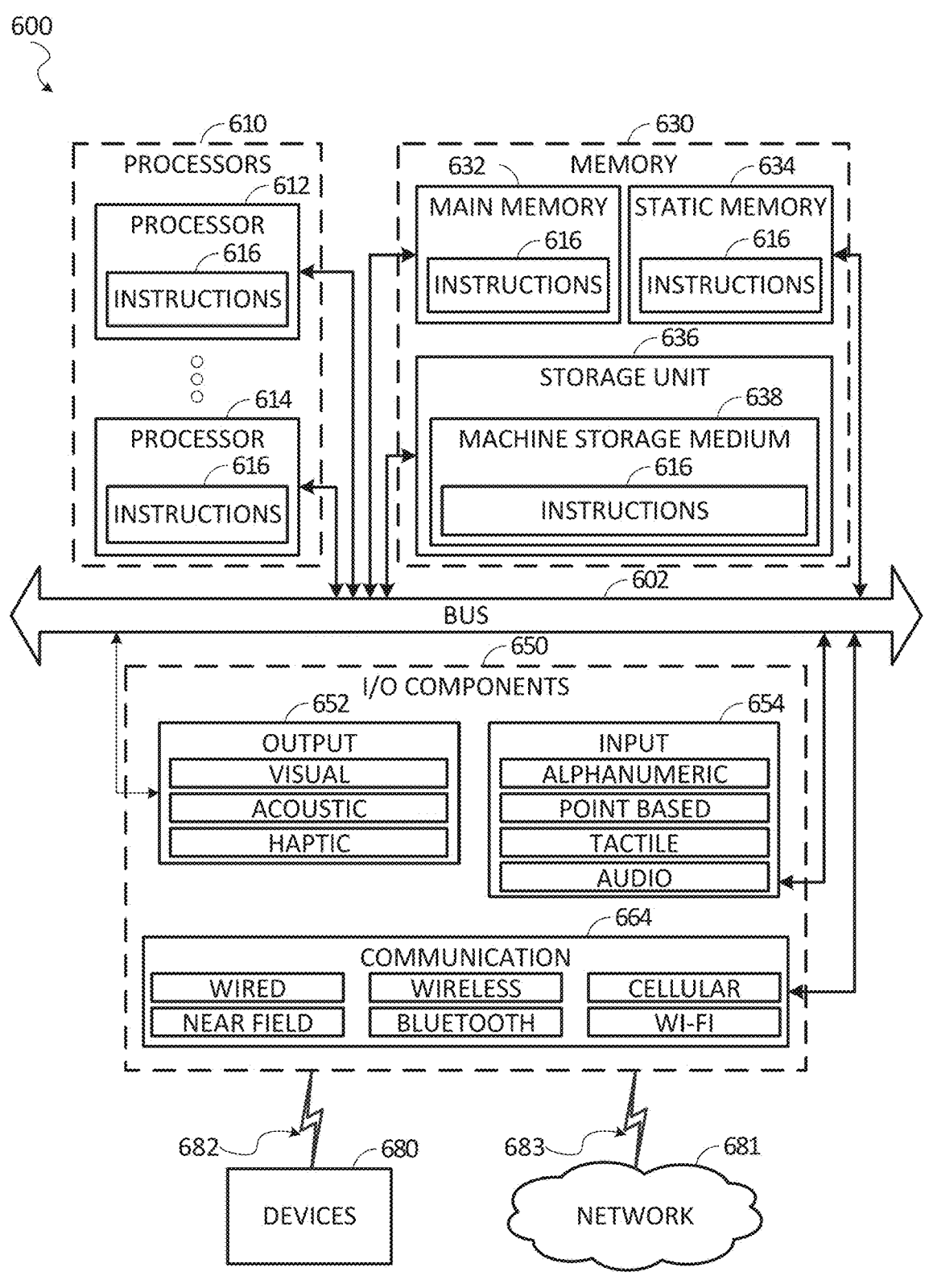
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code), for causing the machine 600 to perform any one or more of the methodologies discussed herein, may be executed. For example, the instructions 616 may cause the machine 600 to execute any one or more operations of any one or more of the methods of FIG. 5 or components in FIGS. 2B, and FIG. 4, by one or more processors. described herein. As another example, the instructions 616 may cause the machine 600 to implement portions of the data flows described herein. In this way, the instructions 616 transform a general, non-programmed machine into a particular machine 600 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 comprising a machine storage medium 638 may store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines, such as mobile phones, will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 681 via a coupler 683 or to devices 680 via a coupling 682. For example, the communication components 664 may include a network interface component or another suitable device to interface with the network 681. In further examples, the communication components 664 may include wired communication components, wireless communication components, cellular communication components, and other communication components to provide communication via other modalities. The devices 680 may be another machine or any of a wide variety of peripheral devices (e.g., a peripheral device coupled via a universal serial bus (USB)). For example, as noted above, the machine 600 may correspond to any one of the client device 114, the compute service manager 108, the execution platform 110, and may include any other of these systems and devices.

The various memories (e.g., 630, 632, 634, and/or memory of the processor(s) 610 and/or the storage unit 636) may store one or more sets of instructions 616 and data structures (e.g., software), embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 681 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 681 or a portion of the network 681 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 681 using a transmission medium via a network interface device (e.g., a network interface component included in the communication components 664), and utilizing any one of a number of well-known transfer protocols (e.g., hypertext transfer protocol (HTTP)). Similarly, the instructions 616 may be transmitted or received using a transmission medium via the coupling 682 (e.g., a peer-to-peer coupling) to the devices 680. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A machine-implemented method comprising:
   receiving one or more queries on a database system, the database system comprising database data that is distributed across a plurality of nodes, the database data tracked using metadata comprising a plurality of metadata layers that describe properties and organization of the database data;
   performing online data integrity checks as part of query execution during processing of the one or more queries to detect data errors in the database data during operations on the database data;
   performing offline data integrity checks on the database data stored in the database system as a background process to analyze consistency between the plurality of metadata layers;
   identifying corrupted data based on results of the online and offline data integrity checks, the results comprising at least one of detected mismatches or detected violations; and
   correcting the identified corrupted data by at least one of rebuilding the database data or removing the corrupted data.

2. The machine-implemented method of claim 1, wherein performing online data integrity checks comprises:
   checking file registration requests to detect violations of column properties;
   performing transaction status checks of expected row count changes; and
   performing execution time checks including recluster accumulated hash checks.

3. The machine-implemented method of claim 1, wherein performing offline data integrity checks comprises: implementing a checking framework to analyze consistency between different metadata layers and underlying data.

4. The machine-implemented method of claim 3, wherein the checking framework comprises: level 0 checks comparing column and data type metadata against global cumulative expression properties data; level 1 checks determining consistency between global cumulative expression properties and second level expression properties; level 2 checks determining consistency between expression properties and micro-partition headers; and level 3 checks confirming consistency between micro-partition headers and underlying data.

5. The machine-implemented method of claim 1, wherein correcting the identified corrupted data comprises:

incrementally rebuilding a subset of micro-partition files and related metadata when underlying data can still be read; and performing file blacklisting and patching for corrupted and unreadable data.

6. The machine-implemented method of claim 1, further comprising:

determining a blast radius of detected data corruption issues by analyzing an extent of impact on existing users and user tables.

7. The machine-implemented method of claim 1, wherein the offline data integrity checks are performed as a background service triggered by compaction or clustering events on the database system.

8. The machine-implemented method of claim 1, wherein the online data integrity checks are performed with minimum overhead during database read and write operations.

9. The machine-implemented method of claim 1, further comprising: extending the offline data integrity checks to support consistency checks for newly implemented database features or tools.

10. The machine-implemented method of claim 1, wherein identifying corrupted data comprises: checking for mismatched metadata values between different layers of the plurality of metadata layers in an increasing sequence from a lower level to a higher level in a metadata hierarchy.

11. A machine comprising:

at least one processor; and at least one memory storing instructions that, when executed by the at least one processor, cause the machine to perform operations comprising:

receiving one or more queries on a database system, the database system comprising database data that is distributed across a plurality of nodes, the database data tracked using metadata comprising a plurality of metadata layers that describe properties and organization of the database data;

performing online data integrity checks as part of query execution during processing of the one or more queries to detect data errors in the database data during operations using the database data;

performing offline data integrity checks on the database data stored in the database system as a background process to analyze consistency between the plurality of metadata layers;

identifying corrupted data based on results of the online and offline data integrity checks, the results comprising at least one of detected mismatches or detected violations; and correcting the identified corrupted data by at least one of rebuilding the database data or removing the corrupted data.

12. The machine of claim 11, wherein performing online data integrity checks comprises:

checking file registration requests to detect violations of column properties; performing transaction status checks of expected row count changes; and performing execution time checks including recluster accumulated hash checks.

13. The machine of claim 11, wherein performing offline data integrity checks comprises: implementing a checking framework to analyze consistency between different metadata layers and underlying data.

14. The machine of claim 13, wherein the checking framework comprises: level 0 checks comparing column and data type metadata against global cumulative expression properties data; level 1 checks determining consistency between global cumulative expression properties and second level expression properties; level 2 checks determining consistency between expression properties and micro-partition headers; and level 3 checks confirming consistency between micro-partition headers and underlying data.

15. The machine of claim 11, wherein correcting the identified corrupted data comprises:

incrementally rebuilding a subset of micro-partition files and related metadata when underlying data can still be read; and performing file blacklisting and patching for corrupted and unreadable data.

16. The machine of claim 11, wherein the operations further comprise:

determining a blast radius of detected data corruption issues by analyzing an extent of impact on existing users and user tables.

17. The machine of claim 11, wherein the offline data integrity checks are performed as a background service triggered by compaction or clustering events on the database system.

18. The machine of claim 11, wherein the online data integrity checks are performed with minimum overhead during database read and write operations.

19. The machine of claim 11, wherein the operations further comprise: extending the offline data integrity checks to support consistency checks for newly implemented database features or tools.

20. The machine of claim 11, wherein identifying corrupted data comprises: checking for mismatched metadata values between different layers of the plurality of metadata layers in an increasing sequence from a lower level to a higher level in a metadata hierarchy.

21. A machine-storage medium storing instructions that, when executed by a machine, cause the machine to perform operations comprising:

receiving one or more queries on a database system, the database system comprising database data that is distributed across a plurality of nodes, the database data tracked using metadata comprising a plurality of metadata layers that describe properties and organization of the database data;

performing online data integrity checks as part of query execution during processing of the one or more queries to detect data errors on the database data during operations on the database data;

performing offline data integrity checks on the database data stored in the database system as a background process to analyze consistency between the plurality of metadata layers;

identifying corrupted data based on results of the online and offline data integrity checks, the results comprising at least one of detected mismatches or detected violations; and correcting the identified corrupted data by at least one of rebuilding the database data or removing the corrupted data.

22. The machine-storage medium of claim 21, wherein performing online data integrity checks comprises:

checking file registration requests to detect violations of column properties; performing transaction status checks of expected row count changes; and performing execution time checks including recluster accumulated hash checks.

23. The machine-storage medium of claim 21, wherein performing offline data integrity checks comprises: implementing a checking framework to analyze consistency between different metadata layers and underlying data.

24. The machine-storage medium of claim 23, wherein the checking framework comprises: level 0 checks comparing column and data type metadata against global cumulative expression properties data; level 1 checks determining consistency between global cumulative expression properties and second level expression properties; level 2 checks determining consistency between expression properties and micro-partition headers; and level 3 checks confirming consistency between micro-partition headers and underlying data.

25. The machine-storage medium of claim 21, wherein correcting the identified corrupted data comprises:

incrementally rebuilding a subset of micro-partition files and related metadata when underlying data can still be read; and performing file blacklisting and patching for corrupted and unreadable data.

26. The machine-storage medium of claim 21, wherein the operations further comprise: determining a blast radius of detected data corruption issues by analyzing an extent of impact on existing users and user tables.

27. The machine-storage medium of claim 21, wherein the offline data integrity checks are performed as a background service triggered by compaction or clustering events on the database system.

28. The machine-storage medium of claim 21, wherein the online data integrity checks are performed with minimum overhead during database read and write operations.

29. The machine-storage medium of claim 21, wherein the operations further comprise: extending the offline data integrity checks to support consistency checks for newly implemented database features or tools.

30. The machine-storage medium of claim 21, wherein identifying corrupted data comprises: checking for mismatched metadata values between different levels of the plurality of metadata layers in an increasing sequence from a lower level to a higher level in a metadata hierarchy.

* * * * *